(12) United States Patent
Mahasenan et al.

(10) Patent No.: US 10,085,111 B2
(45) Date of Patent: Sep. 25, 2018

(54) USER ACCESS TO WIRELESS LOW ENERGY DEVICE

(71) Applicant: Honeywell International Inc., Morris Plains, NJ (US)

(72) Inventors: Arun V. Mahasenan, Trivandrum Kerala (IN); Soumitri N. Kolavennu, Blaine, MN (US); Praveen Kumar Volam, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/096,015

(22) Filed: Apr. 11, 2016

(65) Prior Publication Data

US 2017/0295453 A1  Oct. 12, 2017

(51) Int. Cl.
| | |
|---|---|
| *H04B 7/00* | (2006.01) |
| *H04W 4/00* | (2018.01) |
| *H04W 8/00* | (2009.01) |
| *G05B 15/02* | (2006.01) |
| *F24F 11/30* | (2018.01) |
| *F24F 11/62* | (2018.01) |
| *H04W 4/80* | (2018.01) |
| *H04W 76/10* | (2018.01) |

(52) U.S. Cl.
CPC ............ *H04W 4/008* (2013.01); *F24F 11/30* (2018.01); *F24F 11/62* (2018.01); *G05B 15/02* (2013.01); *H04W 4/80* (2018.02); *H04W 8/005* (2013.01); *H04W 76/10* (2018.02)

(58) Field of Classification Search
CPC ..... H04W 12/02; H04W 12/06; H04W 84/18; H04W 4/008

USPC ........................................................ 455/41.2
See application file for complete search history.

(56) References Cited

U.S. PATENT DOCUMENTS

| | | | | |
|---|---|---|---|---|
| 8,327,178 | B2* | 12/2012 | Vandwalle | H04W 48/08 713/324 |
| 2012/0257561 | A1* | 10/2012 | Redding | H04L 12/1827 370/312 |
| 2014/0169599 | A1* | 6/2014 | Solum | H04R 25/554 381/315 |
| 2014/0355517 | A1* | 12/2014 | Reunamaki | H04W 8/005 370/328 |
| 2014/0378057 | A1* | 12/2014 | Ramon | H04L 9/32 455/41.2 |
| 2015/0130637 | A1 | 5/2015 | Sengstaken, Jr. et al. | |

(Continued)

OTHER PUBLICATIONS

"European Application Serial No. 17165328.0, Extended European Search Report dated Aug. 21, 2017", 10 pgs.

(Continued)

*Primary Examiner* — Ajibola Akinyemi
(74) *Attorney, Agent, or Firm* — Schwegman Lundberg & Woessner, P.A.

(57) ABSTRACT

A method of communicating with multiple other devices by a low energy device, the method including broadcasting advertisements from the low energy device to connect, the advertisements being broadcasted at a slow rate, receiving an event at the low energy device, responsive to receiving the event, broadcasting advertisements at a high rate for a selected period of time, and connecting and disconnecting with the multiple other devices to exchange information related to the event during the selected period of time.

19 Claims, 4 Drawing Sheets

(56) References Cited

U.S. PATENT DOCUMENTS

2016/0040903 A1* 2/2016 Emmons ............. H04L 67/1078
                                                        700/278
2016/0057695 A1   2/2016 Tomida et al.
2016/0080896 A1* 3/2016 Song ..................... H04W 4/008
                                                        455/41.2
2016/0142177 A1* 5/2016 Chou ....................... H04L 5/00
                                                        370/329

OTHER PUBLICATIONS

"SimpleLink™ Bluetooth® low energy CC2640 wireless MCU / Software Developer's Guide For BLE-Stack(TM) Version: 2.0.0", [online]. Retrieved from the Internet: <URL: http://www.ti.com/lit/ug/swru393/swru393. pdf>, (Feb. 2015), 80 pgs.

* cited by examiner

USER ACCESS TO WIRELESS LOW ENERGY DEVICE

BACKGROUND

Battery powered wireless sensors are used in homes and buildings as low power wireless connected devices. One protocol used by such devices is known as Bluetooth® Low Energy (BLE) (A protocol controlled by the Bluetooth Special Interest Group) to provide connectivity for such devices, also referred to as Internet of things (IOT) devices. Such devices typically connect to another device to share information.

SUMMARY

A method of communicating with multiple other devices by a low energy device, the method including broadcasting advertisements from the low energy device to connect, the advertisements being broadcasted at a slow rate, receiving an event at the low energy device, responsive to receiving the event, broadcasting advertisements at a high rate for a selected period of time, and connecting and disconnecting with the multiple other devices to exchange information related to the event during the selected period of time.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Battery powered wireless sensors are used in homes and buildings as low power wireless connected devices. One protocol used by such devices is known as Bluetooth® Low Energy (BLE) to provide connectivity for such devices, also referred to as Internet of things (IOT) devices. Such devices typically connect to another device to share information with that device, but lack multiple user connectivity.

In various embodiments, a low energy wireless device uses fast advertisements to indicate a change of state of the device, allowing multiple other user devices to connect to the device and receive change of state information from the low energy wireless device. The multiple other user devices respond to the fast advertisements, connect, receive the change of state information, and disconnect, allowing each of the multiple other user devices to obtain the change of state information during a period of time during which the fast advertisements are occurring. Note that the change of state can be low energy device initiated, or one of the multiple other user devices can provide a change of state to the low energy wireless device, such as a change in temperature set point in the case of the low energy device being a thermostat.

Figure 1:
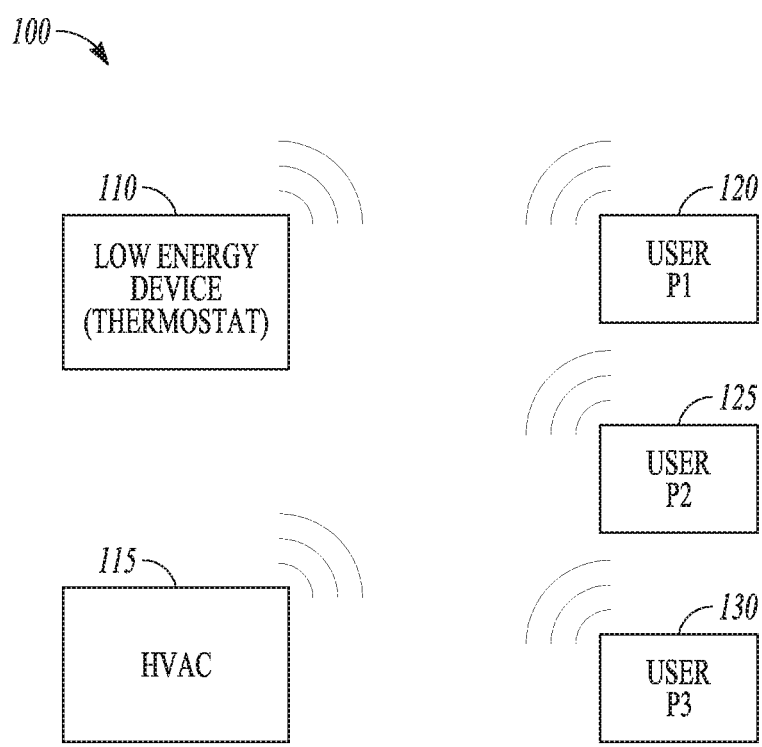
FIG. 1 is a block diagram illustration of a network of multiple devices according to an example embodiment.

FIG. 1 is a block diagram illustration of a network 100 of multiple IOT devices. In one embodiment, a low energy device 110 is a thermostat that controls an HVAC (heating ventilating and air conditioning) unit 115. Several user devices are also shown at user A at 120, user B at 125, and user C at 130. The user devices may receive information from the device 110 and display it to a user of the user device. Each of the devices are shown as having wireless capabilities to communicate with each other. In one embodiment, low energy device 110 is a battery operated thermostat. Since it is battery operated, low energy device 110 is designed to utilize less energy than a utility power source (such as the grid) coupled thermostat, and generally to utilize the least amount of energy possible. Using less energy conserves the battery life of low energy device 110.

In various embodiments, the thermostat is designed to communicate changes in state to the HVAC unit 115 and user devices 120, 125, and 130, which may be smart phones, tablets, or other user devices. Such changes of state may include but not be limited to a change in measured temperature, a change in temperature set point, or other changes. A change in temperature set point may result from another user changing the set point, or from the thermostat running a program that modifies the set point based on the time of day. Still further, a status of the HVAC unit 115 may also result in a change of state. Note that the example of the low energy device 110 being a thermostat is not meant to be limiting. The low energy device 110 in further embodiments may be an air quality monitor, a security system device such as a smoke detector or carbon monoxide detector, or any other IOT type of device. Each of such devices may generate information to be communicated to multiple different devices.

Figure 2:
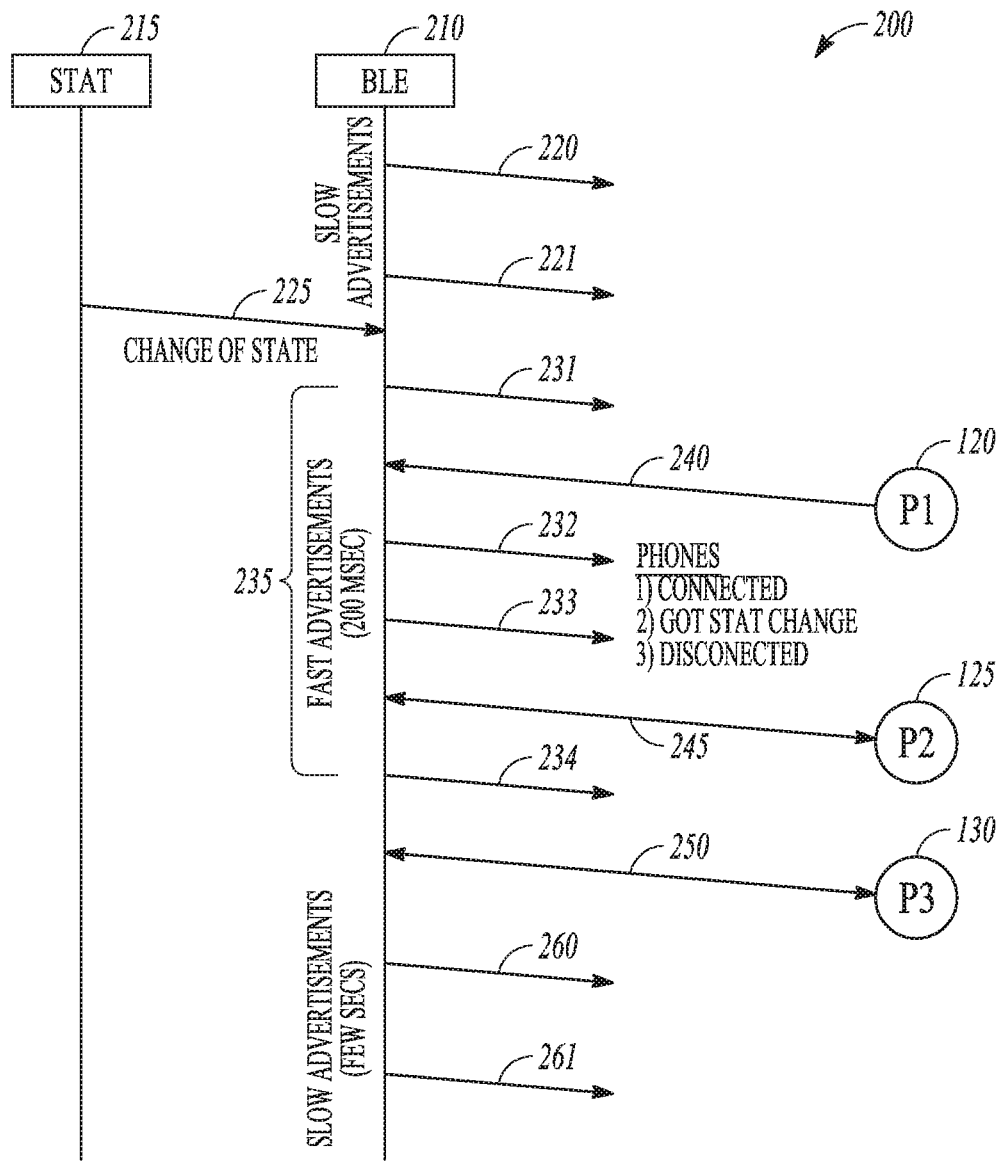
FIG. 2 is a chart illustrating communications between multiple different devices according to an example embodiment.

FIG. 2 is a chart 200 illustrating communications between multiple different devices according to an example embodiment. The example embodiment includes a low energy wireless device 210, such as a BLE device, having an associated state indicated at 215. The state may be stored or received in a memory of the device 210 as indicated at 215. Chart 200 illustrates communications with multiple other devices by the low energy device, first illustrating broadcasting of advertisements 220, 221 from the low energy device to connect with another device. Two such advertisements are shown, being broadcasted at a slow rate, such as every 5 to 10 seconds. The slow rate may be in accordance with the Bluetooth specification for low energy devices, or may be set to a rate designed to conserve battery power, yet provide adequate intervals for connecting with other devices for the particular application being implemented by the low energy wireless device 210.

At 225, an event is received at the low energy device. In one embodiment, the event is a change of state of or for the device 210. Responsive to receiving the event, the device 210 broadcasts advertisements indicated at 231, 232, 233, and 234 at a high rate (every 50 msecs or less) for a selected period of time 235, such as 200 msec. The selected period of time may be varied in further embodiments but should be sufficient to allow an expected number of devices to receive the event information. Advertisements 231, 232, 233, and 234 may be referred to as fast advertisements. In one embodiment, the fast advertisements include a flag that is set to indicate that a change of state has occurred. While four such broadcasts are shown, the number of broadcasts may be greater or less in various embodiments, and may be selected to ensure each of the multiple users can connect to receive information related to the event.

In response to the advertisements 231, 232, 233, and 234 at the high rate for a selected period of time, the multiple other devices will connect, such as by pairing, and disconnect to exchange information related to the event during the selected period of time. In one embodiment, the advertisements 231, 232, 233, and 234 at the high rate may actually contain the state change information, such as a state sequence number or some or string of data representative of the new state which may be 8 or 16 bits of information or more, such as 128 bits. In some embodiments, a sequence number with a maximum advertisement size supported in the BLE specifications or other suitable specifications may be used. For example, state 24 may change to state 25. Many times, the amount of information that can be provided in an advertisement is minimal, such as 5 to 10 bytes in one embodiment, and is not suitable for communicating sufficient information related to the event. In such cases, the user devices each respond to the advertisements at random times during the selected period of time, connect, receive information over the connection, and disconnect in succession. The selected period of time may be set to be long enough to permit all of the multiple such devices to connect and receive the information.

A sequence of such connections is illustrated in FIG. 2 with device 120 responding to fast advertisement 231 at 240, connecting, receive the information related to the event comprising a state change, and disconnecting. Device 125 responds to fast advertisement 233 at 245 and similarly connects, receives the state change, and disconnects. Device 130 responds to fast advertisement 234 at 250 and also connects, receives the state change, and disconnects. Once the selected period of time 235 has expired, the device 210 returns to sending advertisements at the slow rate as indicated at 260 and 261.

Figure 3:
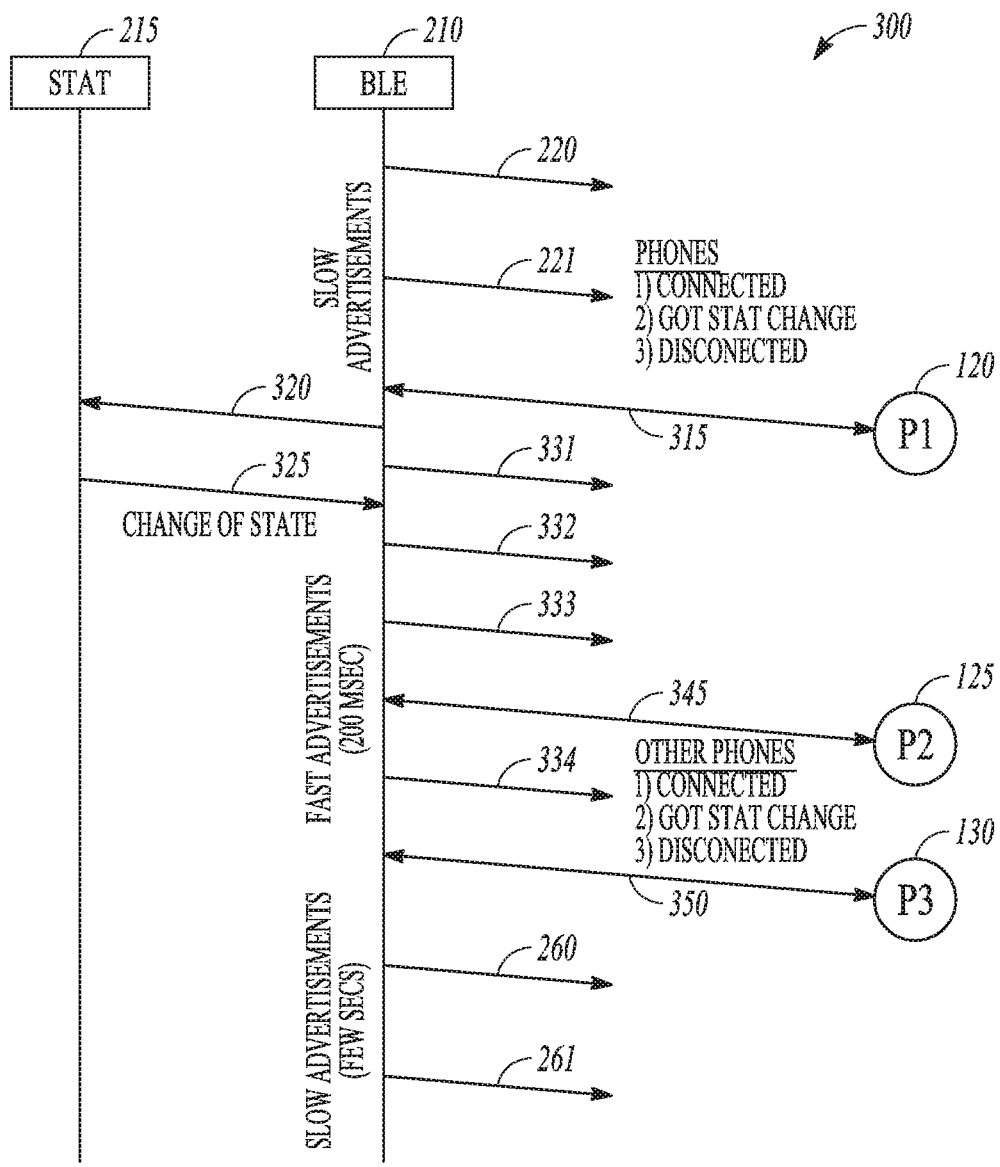
FIG. 3 is a chart illustrating alternative communications between multiple different devices according to an example embodiment.

FIG. 3 is a chart 300 illustrating communications between multiple different devices according to an example embodiment. The example embodiment includes the low energy wireless device 210, such as a BLE device, having an associated state indicated at 215, the same as in FIG. 2. The state may be stored or received in a memory of the device 210 as indicated at 215. Chart 300 illustrates communications with multiple other devices by the low energy device, first illustrating broadcasting of advertisements 220, 221 from the low energy device to connect with another device. Two such advertisements are shown, being broadcasted at a slow rate, such as every 5 to 10 seconds. The slow rate may be in accordance with the Bluetooth specification for low energy devices, or may be set to a rate designed to conserve battery power, yet provide adequate intervals for connecting with other devices for the particular application being implemented by the low energy wireless device 210.

At 315, an event is received at the low energy device from device 120, which connects to the low energy device 210 responsive to the slow advertisement 221. In one embodiment, the event is a change of state for the device 210. Responsive to receiving the event, the device 210 stores the change of state at 215 as indicated by arrow 320, which then informs the device 210 that the change of state has occurred at 325, initiating the fast advertisement broadcasts as indicated at 331, 332, 333, and 334 at a high rate (every 50 mseconds or less) for a selected period of time, such as 200 msec. The selected period of time may be varied in further embodiments but should be sufficient to allow an expected number of devices to receive the event information. In one embodiment, the fast advertisements include a flag that is set to indicate that a change of state has occurred. While four such broadcasts are shown, the number of broadcasts may be greater or less in various embodiments, and may be selected to ensure each of the multiple users can connect to receive information related to the event.

In response to the fast advertisements 331, 332, 333, and 334, the multiple other devices will connect and disconnect to exchange information related to the event during the selected period of time. In one embodiment, the advertisements 331, 332, 333, and 334 at the high rate may actually contain the state change information, such as a state sequence number or some or string of data representative of the new state which may be 8 or 16 bits of information. For example, state 24 may change to state 25. Many times, the amount of information that can be provided in an advertisement is minimal, such as 5 to 10 bytes in one embodiment, and is not suitable for communicating sufficient information related to the event. In such cases, the user devices each respond to the advertisements at random times during the selected period of time, connect, receive information over the connection, and disconnect in succession. The selected period of time may be set to be long enough to permit all of the multiple such devices to connect and receive the information.

A sequence of such connections is illustrated in FIG. 3 with device 120 optionally not responding to the fast advertisements because being the source of the event, device 120 already has the information related to the event. Device 125 responds to fast advertisement 333 at 345 and connects, receives the event information, and disconnects. Device 130 responds to fast advertisement 334 at 350 and also connects, receives the event information, which may comprise a state change, and disconnects. Once the selected period of time has expired, the device 210 returns to sending advertisements at the slow rate as indicated at 260 and 261.

Figure 4:
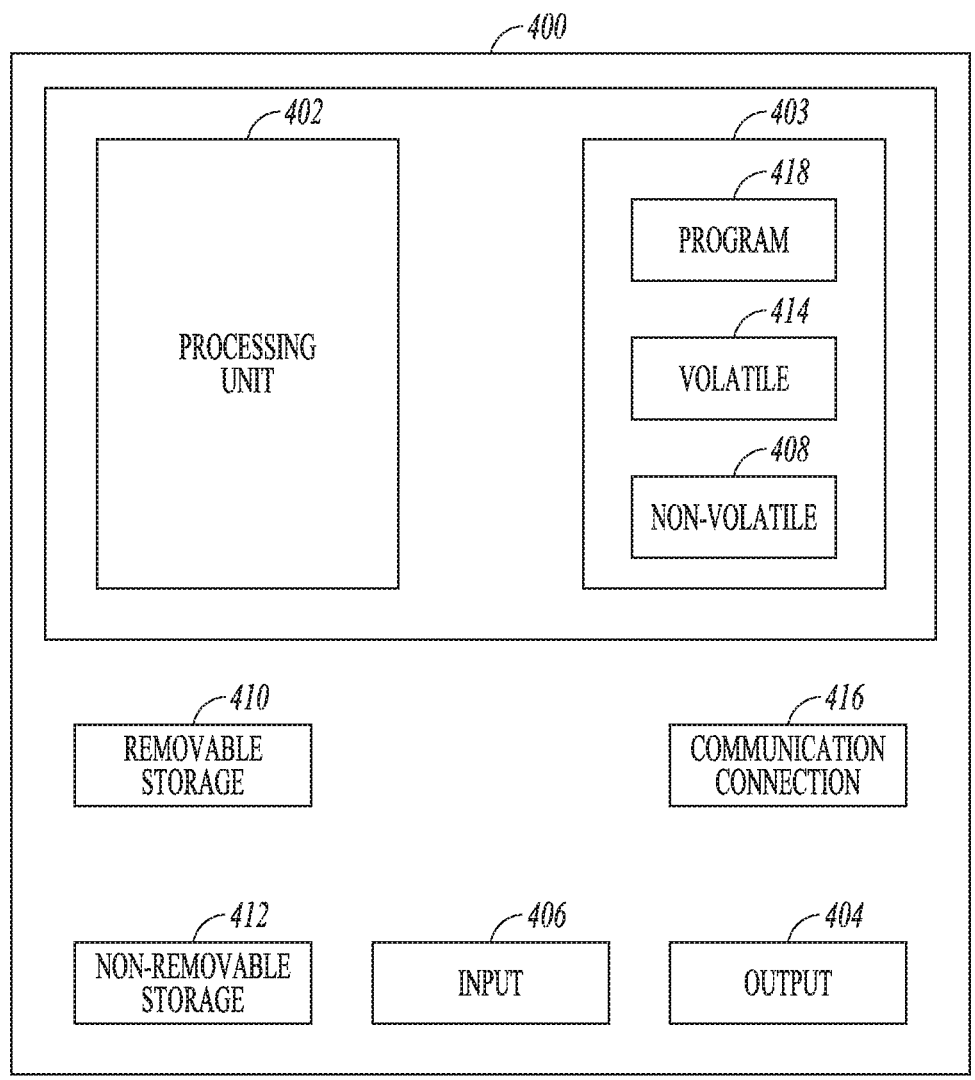
FIG. 4 is a block diagram illustrating electronic devices for implementing devices and performing operations according to example embodiments.

FIG. 4 is a block schematic diagram of a computer system 400 to implement devices and perform operations for implementing methods according to example embodiments. All components need not be used in various embodiments. One example computing device in the form of a computer 400, may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch. BLE device. BLE wearable device, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 400, the storage may also or alternatively include cloud-based storage accessible via a network, such as the Internet.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 400 may include or have access to a computing environment that includes input 406, output 404, and a communication connection 416, such as a transceiver, radio, or other component for communication over a wired or wireless network or wireless connection. Output 404 may include a display device, such as a touchscreen, that also may serve as an input device. The input 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers, including cloud based servers and storage. The remote computer may include a personal computer (PC), server, router, network PC, cell phone, tablet, a peer device, or other common network node, or the like. The communication connection may include a Local Area Network (LAN), a Wide Area Network (WAN), cellular, WiFi, Bluetooth, Bluetooth low energy, or other networks.

Computer-readable instructions stored on a computer-readable storage device are executable by the processing unit 402 of the computer 400. A hard drive, CD-ROM, and RAM are some examples of articles including a non-transitory computer-readable medium such as a storage device. The terms computer-readable medium and storage device do not include carrier waves. For example, a computer program 418 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 400 to provide generic access controls in a COM based computer network system having multiple users and servers.

EXAMPLES

1. A method of communicating with multiple other devices by a low energy device, the method including:

broadcasting advertisements from the low energy device to connect, the advertisements being broadcasted at a slow rate;

receiving an event at the low energy device;

responsive to receiving the event, broadcasting advertisements at a high rate for a selected period of time; and connecting and disconnecting with the multiple other devices to exchange information related to the event during the selected period of time.

2. The method of example 1 wherein the low energy device is a Bluetooth low energy enabled low energy device.

3. The method of any of examples 1-2 wherein the selected period of time is approximately 200 msec.

4. The method of any of examples 1-3 wherein the event comprises a change of state.

5. The method of example 4 wherein one of the multiple other devices connects to the low energy device responsive to one of the advertisements broadcasted at the slow rate.

6. The method of any of examples 1-5 wherein connections to the other multiple devices occur at random times during the selected period of time.

7. The method of any of examples 1-6 and further comprising, following the selected period of time, broadcasting advertisements from the low energy device to connect, the advertisements being broadcasted at a slow rate 8. The method of any of examples 1-7 wherein the advertisements broadcast at the fast rate include a new state sequence number.

9. The method of example 8 wherein the advertisement broadcast at the fast rate further include data representative of a new state.

10. A machine readable storage device having instructions for execution by a processor of the machine to perform operations comprising:

broadcasting advertisements from a low energy device to connect, the advertisements being broadcasted at a slow rate;

receiving an event at the low energy device;

responsive to receiving the event, broadcasting advertisements at a high rate for a selected period of time; and connecting and disconnecting with the multiple other devices to exchange information related to the event during the selected period of time.

11. The machine readable storage device of example 10 wherein the low energy device is a Bluetooth low energy enabled low energy device.

12. The machine readable storage device of any of examples 10-11 wherein the selected period of time is approximately 200 msec.

14. The machine readable storage device of example 12 wherein one of the multiple other devices connects to the low energy device responsive to one of the advertisements broadcasted at the slow rate.

15. The machine readable storage device of any of examples 10-14 and further comprising, following the selected period of time, broadcasting advertisements from the low energy device to connect, the advertisements being broadcasted at a slow rate 16. The machine readable storage device of any of examples 10-15 wherein the advertisements broadcast at the fast rate include a new state sequence number and data representative of a new state.

17. A device comprising:
a processor;
a sensor supported by the device; and
a memory device coupled to the processor and having a program stored thereon for execution by the processor to perform operations comprising:

broadcasting advertisements from the low energy device to connect, the advertisements being broadcasted at a slow rate;

receiving an event at the low energy device;

responsive to receiving the event, broadcasting advertisements at a high rate for a selected period of time; and connecting and disconnecting with the multiple other devices to exchange information related to the event during the selected period of time.

18. The device of example 17 wherein the event comprises a change of state and wherein one of the multiple other devices connects to the low energy device responsive to one of the advertisements broadcasted at the slow rate.

19. The device of any of examples 17-18 wherein the operations further comprise, following the selected period of time, broadcasting advertisements from the low energy device to connect, the advertisements being broadcasted at a slow rate 20. The device of any of examples 17-19 wherein the advertisements broadcast at the fast rate include a new state sequence number and data representative of a new state.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method of communicating with multiple other devices by a low energy thermostat device, the method comprising:

broadcasting advertisements from the low energy thermostat device to connect, the advertisements being broadcasted at a slow rate, the slow rate including seconds between successive advertisements;

receiving an event at the low energy thermostat device, the event including a change in a measured temperature or a change in a temperature set point;

responsive to receiving the event, broadcasting advertisements at a fast rate for a selected period of time, the selected period of time including time for all of the multiple other devices to connect, receive information related to the event, and disconnect from the low energy thermostat device, and the fast rate including less than fifty milliseconds between successive advertisements; and connecting and disconnecting with the multiple other devices to exchange information related to the event during the selected period of time.

2. The method of claim 1 wherein the low energy thermostat device is a Bluetooth low energy enabled low energy device.

3. The method of claim 1 wherein the selected period of time is approximately 200 msec.

4. The method of claim 1, wherein the connecting and disconnection with the multiple other devices is performed responsive to the advertisements that are broadcasted at the fast rate.

5. The method of claim 4 wherein one of the multiple other devices connects to the low energy thermostat device responsive to one of the advertisements broadcasted at the slow rate.

6. The method of claim 1 wherein connections to the other multiple devices occur at random times during the selected period of time responsive to the advertisements that are broadcast at the fast rate.

7. The method of claim 1 and further comprising, following the selected period of time, broadcasting advertisements from the low energy thermostat device to connect, the advertisements being broadcasted at the slow rate.

8. The method of claim 1 wherein the advertisements broadcast at the fast rate include a new state sequence number.

9. The method of claim 8 wherein the advertisement broadcast at the fast rate further include data representative of a new state.

10. A machine readable storage device having instructions for execution by a processor of the machine to perform operations comprising:

broadcasting advertisements from a low energy device to connect, the advertisements being broadcasted at a slow rate, the slow rate including between about five and ten seconds between successive advertisements;

receiving an event at the low energy device;

responsive to receiving the event, broadcasting advertisements at a fast rate for a selected period of time, the selected period of time including time for all of the multiple other devices to connect, receive information related to the event, and disconnect from the low energy device, and the fast rate including less than fifty milliseconds between successive advertisements; and connecting and disconnecting with the multiple other devices to exchange information related to the event during the selected period of time.

11. The machine readable storage device of claim 10 wherein the low energy device is a Bluetooth low energy enabled low energy device.

12. The machine readable storage device of claim 10 wherein the selected period of time is approximately 200 msec.

13. The machine readable storage device of claim 12 wherein one of the multiple other devices connects to the low energy device responsive to one of the advertisements broadcasted at the slow rate.

14. The machine readable storage device of claim 10 and further comprising, following the selected period of time, broadcasting advertisements from the low energy device to connect, the advertisements being broadcasted at a slow rate.

15. The machine readable storage device of claim 10 wherein the advertisements broadcast at the fast rate include a new state sequence number and data representative of a new state.

16. A device comprising:

a processor;

a sensor supported by the device; and a memory device coupled to the processor and having a program stored thereon for execution by the processor to perform operations comprising:

broadcasting advertisements from the low energy device to connect, the advertisements being broadcasted at a slow rate, the slow rate including between about five and ten seconds between successive advertisements;

receiving an event at the low energy device;

responsive to receiving the event, broadcasting advertisements at a fast rate for a selected period of time, the selected period of time including time for all of the multiple other devices to connect, receive information related to the event, and disconnect from the low energy device, and the fast rate including less than fifty milliseconds between successive advertisements; and connecting and disconnecting with the multiple other devices to exchange information related to the event during the selected period of time.

17. The device of claim 16, wherein one of the multiple other devices connects to the low energy device responsive to one of the advertisements broadcasted at the slow rate.

18. The device of claim 16 wherein the operations further comprise, following the selected period of time, broadcasting advertisements from the low energy device to connect, the advertisements being broadcasted at a slow rate.

19. The device of claim 16 wherein the advertisements broadcast at the fast rate include a new state sequence number and data representative of a new state.

* * * * *